United States Patent
Yamada et al.

(10) Patent No.: US 7,356,261 B2
(45) Date of Patent: Apr. 8, 2008

(54) OPTICAL WIRELESS COMMUNICATIONS SYSTEM

(75) Inventors: Kiriko Yamada, Yokohama (JP);
Takayoshi Sasao, Yokohama (JP);
Masahisa Sakai, Yokohama (JP);
Junichi Kubota, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 567 days.

(21) Appl. No.: 10/770,281

(22) Filed: Feb. 2, 2004

(65) Prior Publication Data

US 2004/0190898 A1    Sep. 30, 2004

(30) Foreign Application Priority Data

Feb. 7, 2003    (JP)    ............................. 2003-031375

(51) Int. Cl.
  *H04B 10/10*    (2006.01)
(52) U.S. Cl. .................... 398/129; 398/106; 398/32
(58) Field of Classification Search ........ 398/128–129, 398/32, 106
See application file for complete search history.

(56) References Cited

U.S. PATENT DOCUMENTS

| 5,532,858 | A  | 7/1996 | Hirohashi et al. | .......... 359/159 |
| 5,710,652 | A  | 1/1998 | Bloom et al. | ................ 359/152 |
| 6,525,856 | B1 | 2/2003 | Maruyama et al. | ......... 359/173 |
| 6,616,352 | B1 | 9/2003 | Shigeta et al. | ............. 398/156 |
| 2002/0154364 | A1* | 10/2002 | Green et al. | ................. 359/172 |

FOREIGN PATENT DOCUMENTS

| JP | 04-003664 | 1/1992 |
| JP | 05-136739 | 6/1993 |
| JP | 06-224858 | 8/1994 |
| JP | 2000-022632 | 1/2000 |
| WO | WO 02/073835 | 9/2002 |

OTHER PUBLICATIONS

Chinese Office Action issued Feb. 10, 2006, with English translation, Nov. 16, 2006.
International Search Report, Mar. 19, 2007, European Patent Office.

* cited by examiner

*Primary Examiner*—Leslie Pascal
(74) *Attorney, Agent, or Firm*—Renner, Kenner, Greive, Bobak, Taylor & Weber (57) ABSTRACT

An optical wireless communications system has a first optical wireless communications apparatus for transmitting a pilot beam and a second optical wireless communications apparatus for receiving the pilot beam to have a match for an optical axis of the first optical wireless communications apparatus and another optical axis of the second optical wireless communications apparatus. The first optical wireless communications apparatus has a modulator for modulating the pilot beam with a specific signal. The second optical wireless communications apparatus has a demodulator for demodulating the modulated and transmitted pilot beam to reproduce the specific signal and sending the reproduced specific signal to at least either the second optical wireless communications apparatus or an apparatus connected to the second optical wireless communications apparatus.

4 Claims, 9 Drawing Sheets

OPTICAL WIRELESS COMMUNICATIONS SYSTEM

BACKGROUND OF THE INVENTION

The present invention relates to an optical wireless communications system for transmitting, for example, video signals to a video system in which a video supply apparatus and a video display apparatus are separated from each other.

Figure 1:
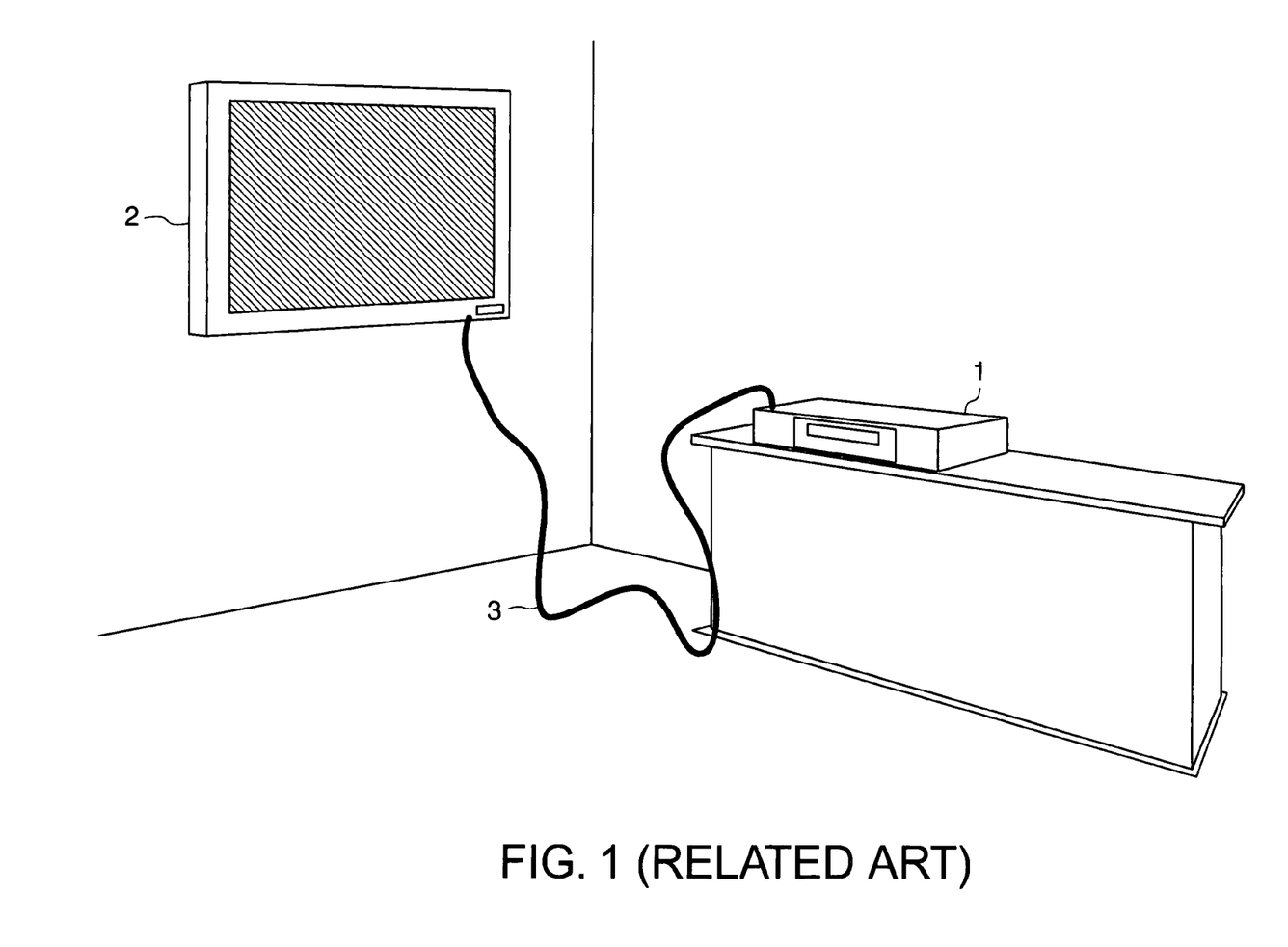
FIG. 1 illustrates a known separated-type video system.

Illustrated in FIG. 1 is a known separated-type video system in which a video supply apparatus 1 and a video display apparatus 2 are separated from each other. Video and audio signals are transmitted from the video supply apparatus 1 to the video display apparatus 2 through a dedicated connector cable 3.

When users purchase separated-type video systems such as home-use plasma display TVs, an about 3 m-length connector cable is attached to each TV as an accessory. Thus, he or she must purchase another longer connector cable, if required. Such a connector cable is elastic and usually has a diameter of about 10 mm. Thus, care must be taken when laying a connector cable.

A thin video display apparatus of a known separated-type video system can be hung over a wall but requires a relatively thick connector cable laid on the wall, which marring the beauty. Moreover, the location of placement of a video supply apparatus, such as a tuner, is limited due to the connector cable laid on the wall. Therefore, the video supply apparatus and the video display apparatus cannot be freely placed apart from each other.

A known electromagnetic video/audio transmission interface instead of such a connector cable has a limited transfer speed and requires signal compression.

Figure 2:
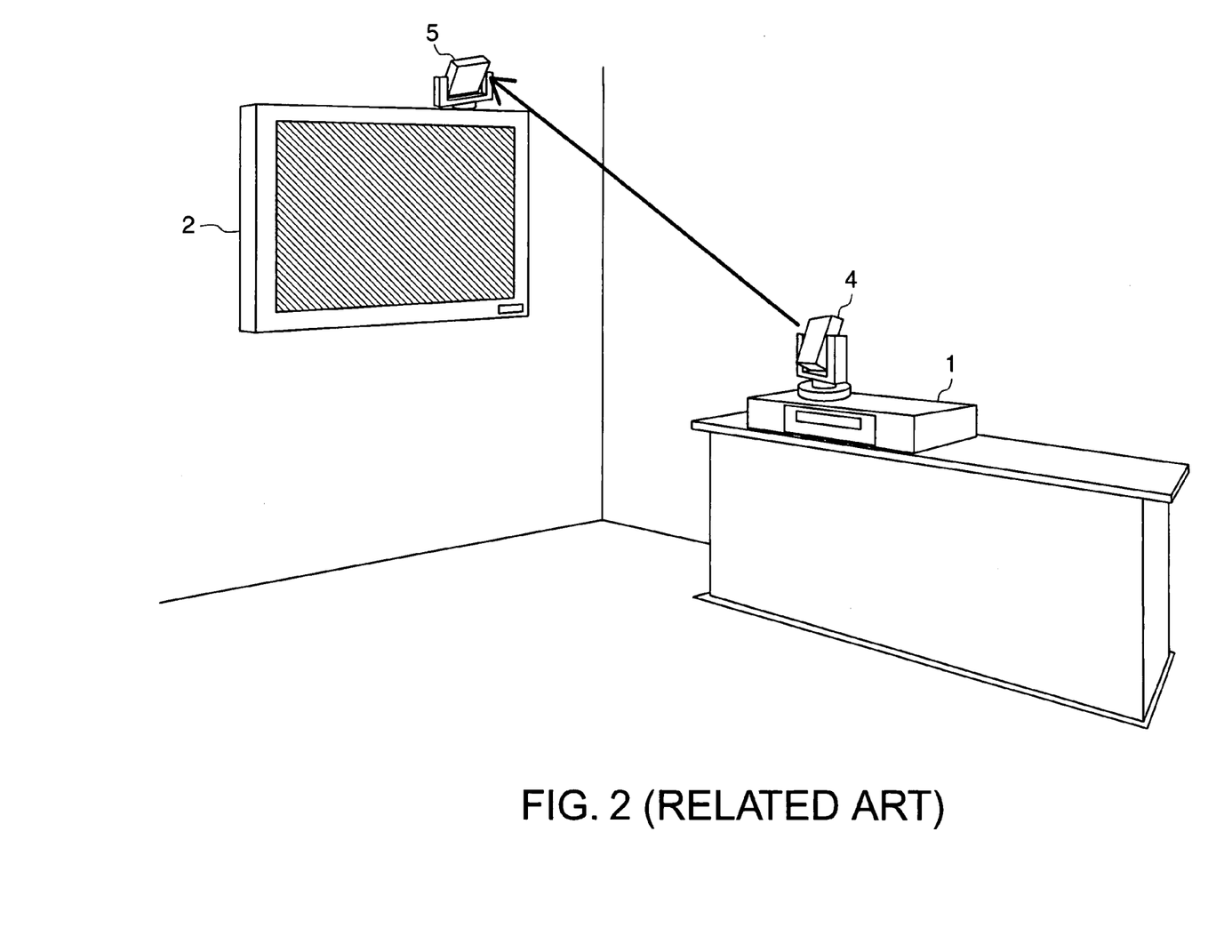
FIG. 2 illustrates a known optical wireless communications system.

Also illustrated in FIG. 2 is a known optical wireless communications system disclosed, for example, in Japanese Unexamined Patent Publication No. 2000-22632.

This system is equipped with an optical transmitter 4 set on a video supply apparatus 1 and an optical receiver 5 set on a video display apparatus 2. The optical transmitter 4 emits an optical signal modulated with video and audio signals. The optical receiver 5 receives and demodulates the optical signal to reproduce the video and audio signals. A laser diode used as a photoemitter for the optical transmitter 4 serves to transmit an optical signal at high speed, thus achieving non-compression signal transmission even for high-vision video signals.

Optical wireless communications systems require optical-axis adjustments between an optical transmitter and an optical receiver. For example, Japanese Patent No. 3059870 discloses an optical-axis adjusting method which employs a guide (pilot) beam besides a light beam for signal transmission.

In usual all-in-one type TV sets having a video supply apparatus integrated with a video display apparatus, a user points a remote controller towards the video display apparatus for several adjustments to the video supply apparatus, such as, channel change and volume control.

Compared to all-in-one type TV sets, in separated-type video systems, such as the one illustrated in FIG. 2, a user must point a remote controller towards the video supply apparatus 1, not the video display apparatus 2, for adjustments to the video supply apparatus 1, such as, channel change and volume control.

Nevertheless, since most users are accustomed to point a remote controller towards a video display apparatus, he or she often cannot help but point a remote controller towards the video display apparatus 2, not the video supply apparatus 1, even in the video system illustrated in FIG. 2. This is very inconvenient for users.

In order to avoid such a problem, the video display apparatus 2 can be equipped with a control-signal receiver, a receiver for receiving a remote control signal sent from a remote controller.

The received remote control signal is transmitted from the optical receiver 5 to the video supply apparatus 1 via the optical transmitter 4.

Notwithstanding, such a system requires a control-signal transmitter at the optical receiver 5 while a control-signal receiver at the optical transmitter 4. This makes the system complex and expensive.

Moreover, in order to confirm whether the video display apparatus 2 and the optical receiver 5 are normally working, information on whether these apparatuses are normally working must be transmitted from the optical receiver 5 to the optical transmitter 4. This mechanism requires a transmitter for transmitting such information at the optical receiver 5 while a receiver for receiving such information at the optical transmitter 4. This also makes the system complex and expensive.

SUMMARY OF THE INVENTION

A purpose of the present invention is to provide an optical wireless communications system in which a remote control signal or other information can be transmitted from an optical wireless communications apparatus to another optical wireless communications apparatus, in simple configuration.

The present invention provides an optical wireless communications system comprising: a first optical wireless communications apparatus for transmitting a pilot beam; and a second optical wireless communications apparatus for receiving the pilot beam to have a match for an optical axis of the first optical wireless communications apparatus and another optical axis of the second optical wireless communications apparatus, wherein the first optical wireless communications apparatus includes a modulator for modulating the pilot beam with a specific signal, and the second optical wireless communications apparatus includes a demodulator for demodulating the modulated and transmitted pilot beam to reproduce the specific signal and sending the reproduced specific signal to at least either the second optical wireless communications apparatus or an apparatus connected to the second optical wireless communications apparatus.

Moreover, the present invention provides an optical wireless communications system to be used for a video system having a video supply apparatus and a video display apparatus placed apart from each other comprising: a first optical wireless communications apparatus, provided for the video display apparatus, for transmitting a pilot beam; and a second optical wireless communications apparatus, provided for the video supply apparatus, for transmitting an optical signal carrying a video signal to the video display apparatus via the first optical wireless communications apparatus and for receiving the pilot beam to have a match for an optical axis of the first optical wireless communications apparatus and another optical axis of the second optical wireless communications apparatus, wherein the first optical wireless communications apparatus includes a modulator for modulating the pilot beam with a specific signal, and the second optical wireless communications apparatus includes a demodulator for demodulating the modulated and transmitted pilot beam to reproduce the specific signal and sending the reproduced specific signal to at least either the second optical wireless communications apparatus or an apparatus connected to the second optical wireless communications apparatus.

DETAILED DESCRIPTION OF PREFERRED EMBODIMENT

Disclosed next with reference to the drawings are several embodiments of optical wireless communications systems applicable to separated-type optical video systems in which a video supply apparatus and a video display apparatus are placed apart from each other. The separated-type video systems may be a plasma display, a liquid crystal display, rear projector, etc.

First Embodiment

Figure 3:
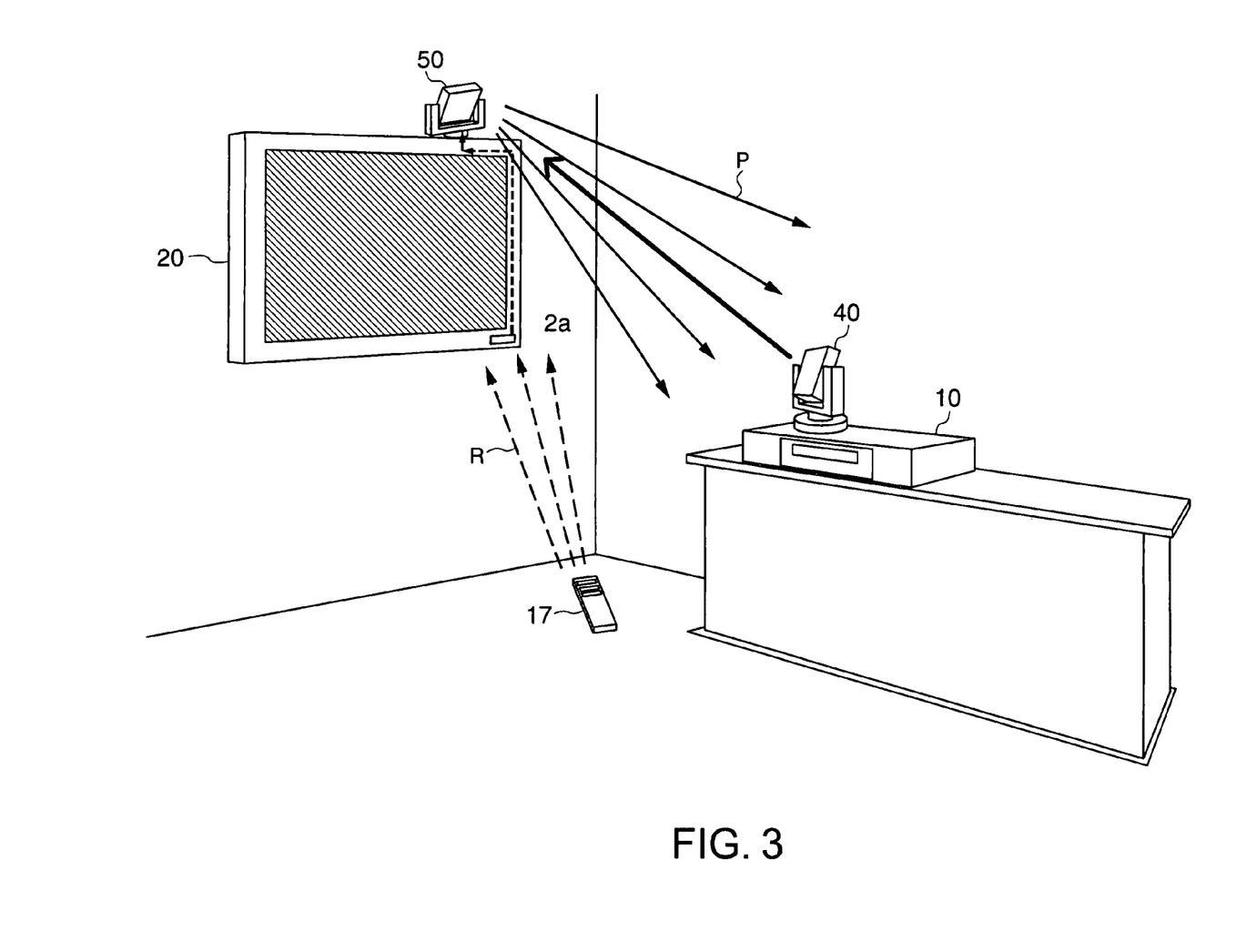
FIG. 3 illustrates a first embodiment of an optical wireless communications system according to the present invention.

Illustrated in FIG. 3 is a first embodiment of an optical wireless communications system according to the present invention applicable to a separated-type video system in which a video supply apparatus 10 and a video display apparatus 20 are placed apart from each other. An optical signal carrying video and audio signals is transmitted from the video supply apparatus 10 to the video display apparatus 20 via the optical wireless communications system.

This system is equipped with an optical transceiver 40 connected to the video supply apparatus 10 and another optical transceiver 50 connected to the video display apparatus 20.

The optical transceiver 40 converts video and audio signals supplied by the video supply apparatus 10 into an optical signal and emits the optical signal. The optical transceiver 50 receives and demodulates the optical signal to reproduce the video and audio signals, and sends the reproduced video and audio signals to the video display apparatus 20.

For secure the optical communications, the optical transceiver 50 transmits a pilot beam P to the optical transceiver 40. The optical transceiver 40 receives the pilot beam P for optical-axis adjustments.

The video display apparatus 20 is equipped with a control-signal receiver 2a, a receiver for receiving, for example, an infrared remote control signal R from a wireless remote controller 17 for controlling the video supply apparatus 10. The optical transceiver 40 may also be controlled by the remote controller 17. The remote-control signal receiver 2a may be installed in the optical transceiver 50.

The optical transceiver 50 modulates the pilot beam P with the remote control signal R received at the control-signal receiver 2a, and transmits the modulated pilot beam P to the optical transceiver 40, via a pilot-beam transmitter (which will be disclosed later) installed in the optical transceiver 50.

The optical transceiver 40 receives the modulated pilot beam P via a pilot-beam receiver (which will be disclosed later) installed therein, reproduces the remote control signal R and sends the reproduced signal R to the video supply apparatus 10.

Figure 4A:
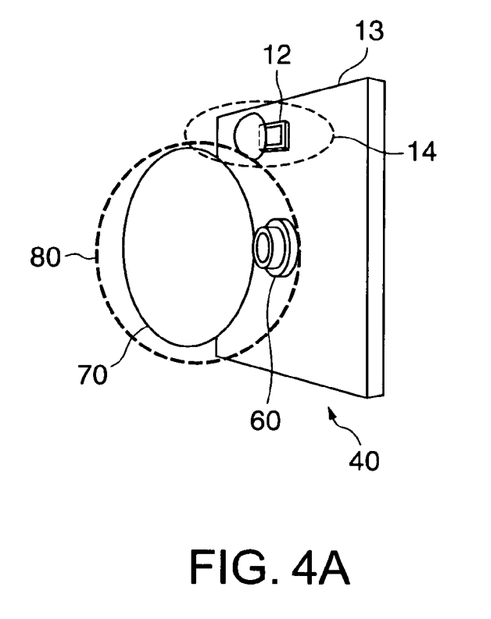
FIGS. 4A and 4B illustrate the main configuration of an optical transmitter shown in FIG. 3.

As illustrated in FIG. 4A, the optical transceiver 40 is equipped with a photoemitter 80 and a divergent-light receptor (the pilot-beam receiver) 14.

The photoemitter 80 converts video and audio signals supplied by the video supply apparatus 10 into an optical signal and transmits the optical signal to the optical transceiver 50. The divergent-light receptor 14 converts a divergent optical signal (the pilot beam P for optical-axis adjustments) transmitted from the optical transceiver 50 into an electric signal.

The photoemitter 80 includes an optical emitting device 60, such as an LED or LD (laser diode), and an optical element 70, such as a lens. The divergent-light receptor 14 includes an optical receiving device 12 (which will be disclosed later) and an optical element 13, such as a lens.

Figure 4B:
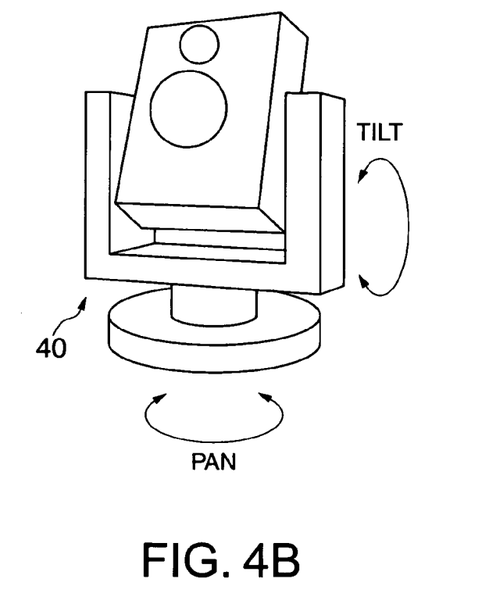

As illustrated in FIG. 4B, the photoemitter 80 and the divergent-light receptor 14 are allowed to rotate in a horizontal (PAN) and also a vertical (TILT) direction, as indicated by arrows, so that they can be pointed towards the optical transceiver 50.

Figure 5A:
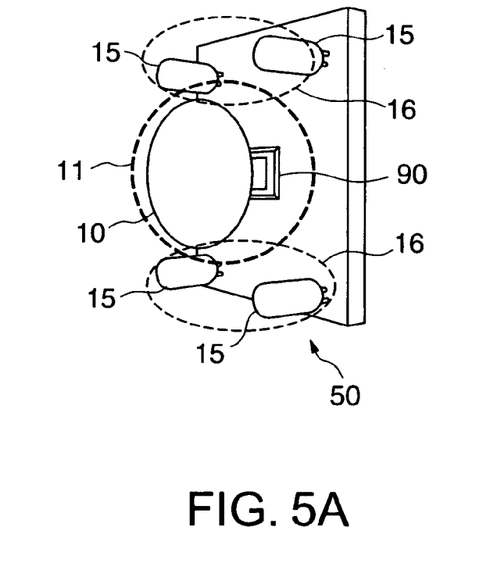
FIGS. 5A and 5B illustrate the main configuration of an optical receiver shown in FIG. 3.

Also illustrated in FIG. 5A, the optical transceiver 50 is equipped with a photoreceptor 11 and a divergent-light emitter (the pilot-beam transmitter) 16.

The photoreceptor 11 reproduces video and audio signals from the optical signal transmitted by the optical transceiver 40 and sends the video and audio signals to the video display apparatus 20. The divergent-light emitter 16 modulates the pilot beam P for optical-axis adjustments with the remote control signal R received at the control-signal receiver 2a and transmits the modulated divergent pilot beam P.

The photoreceptor 11 includes an optical receiving device 90, such as a PD (photodiode) or an APD (avalanche photodiode), and an optical element 10, such as a lens. The divergent-light emitter 16 includes optical emitting devices 15i such as LEDs for emitting divergent light.

Figure 5B:
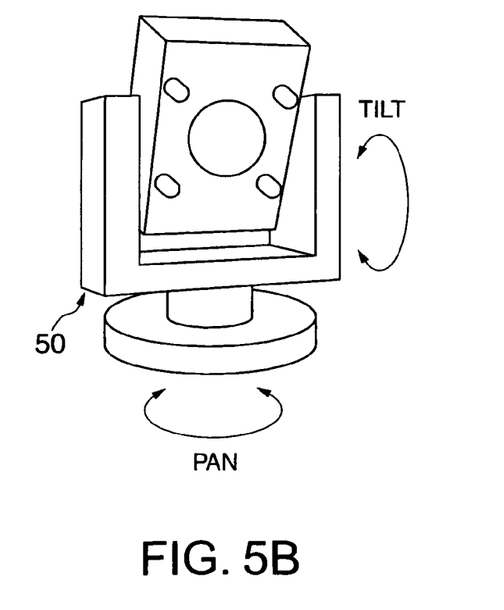

As illustrated in FIG. 5B, the photoreceptor 11 and the divergent-light emitter 16 are allowed to rotate in a horizontal (PAN) and also a vertical (TILT) direction, as indicated by arrows, so that they can be pointed towards the optical transceiver 40.

In operation, the optical transceiver 50 is roughly pointed towards the optical transceiver 40. The divergent-light emitter 16 of the optical transceiver 50 emits the divergent pilot beam P for optical-axis adjustments. The divergent-light receptor 14 catches the pilot beam P transmitted from the divergent-light emitter 16, while the optical transceiver 40 is rotating, to have a match for the optical axes between the optical transceivers 40 and 50.

Figure 6:
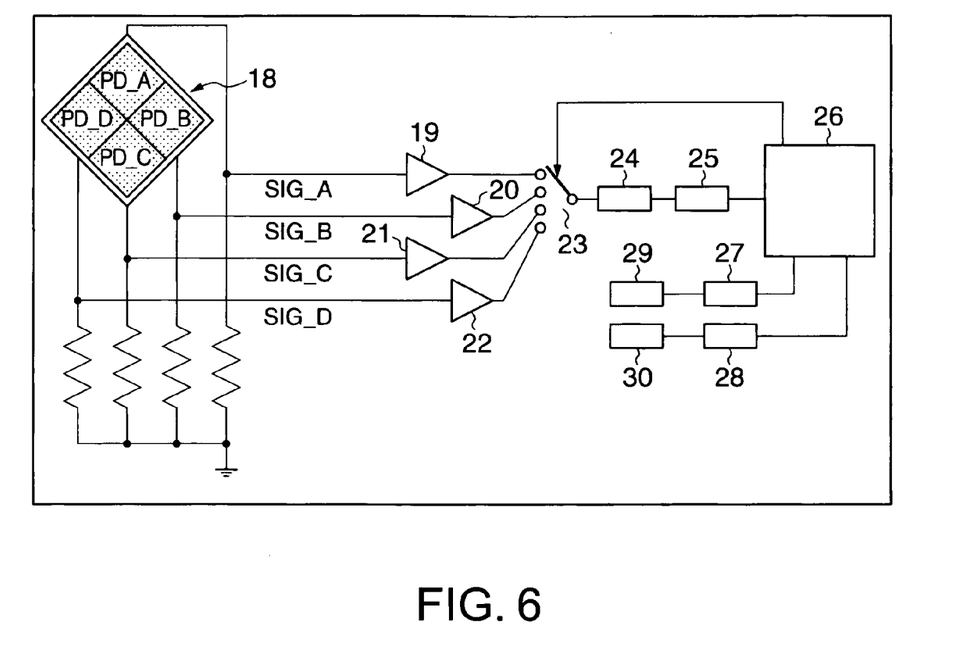
FIG. 6 shows a circuit block diagram for achieving optical-axis adjustments in the first embodiment.
Figure 7:
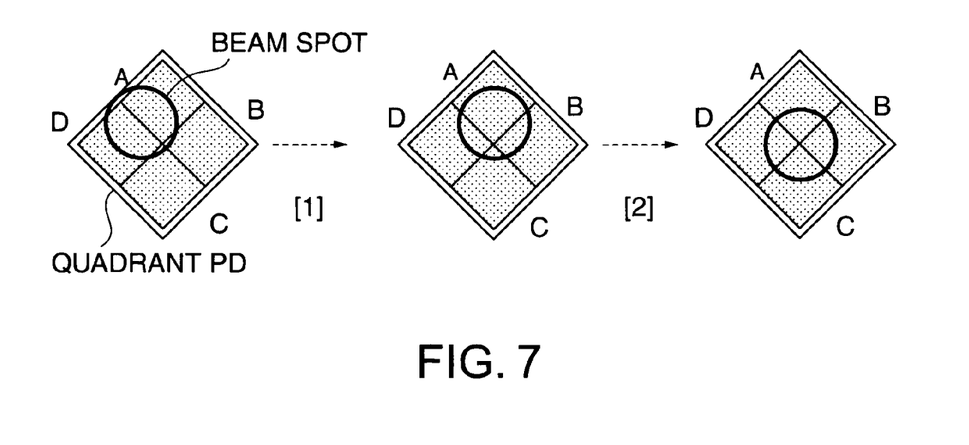
FIG. 7 illustrates movements of a beam spot used in the optical-axis adjustments in the first embodiment.
Figure 8:
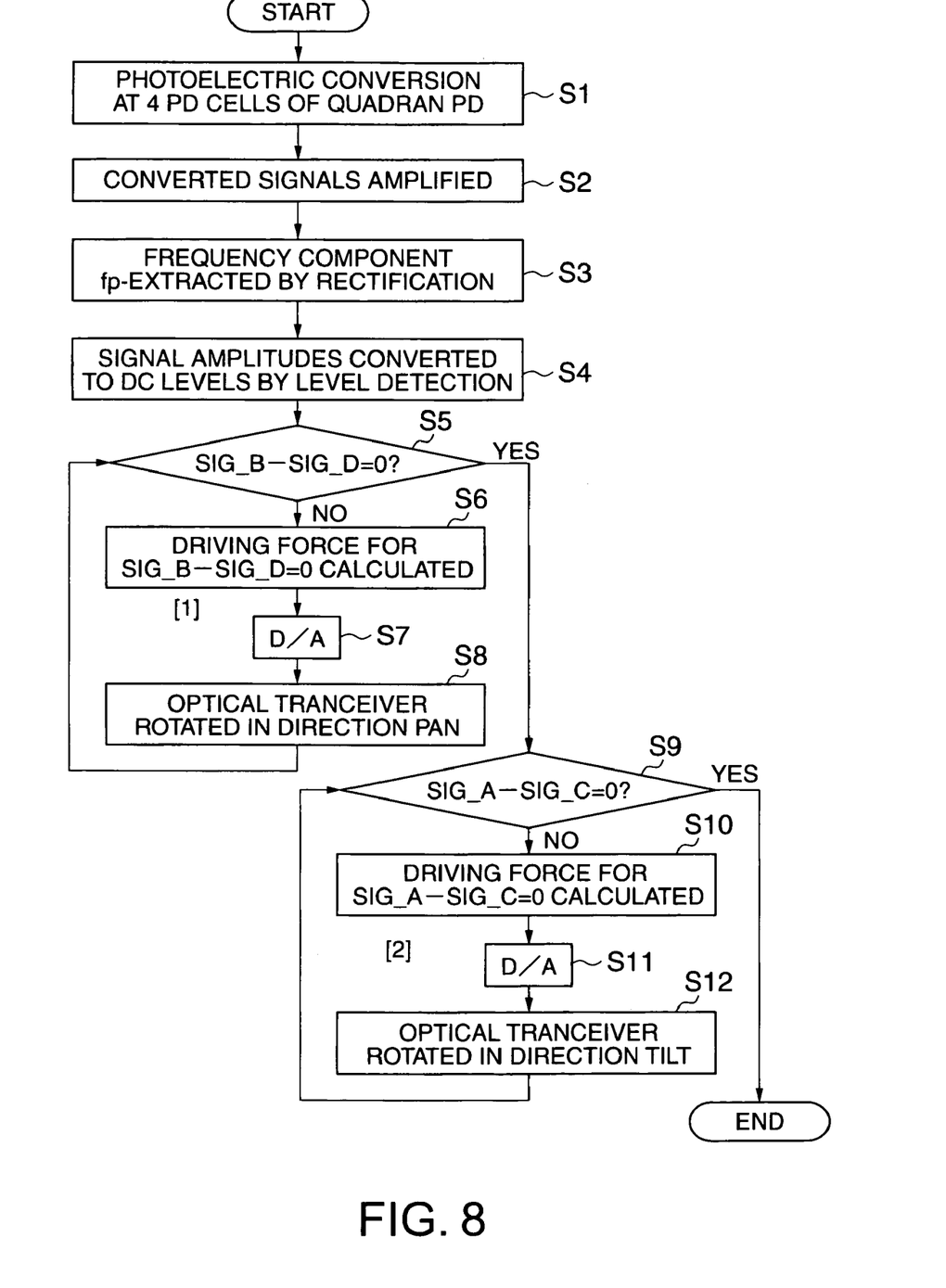
FIG. 8 shows a flowchart indicating procedures of optical-axis adjustments in the first embodiment.

Disclosed next with reference to FIGS. 6, 7 and 8 is a method of optical-axis adjustments with a quadrant PD 18 as the optical receiving device 12 of the divergent-light receptor 14. FIG. 6 shows a circuit block diagram installed in the optical transceiver 40 for achieving optical-axis adjustments with a pilot beam P. FIG. 7 illustrates movements of a spot of the pilot beam P on the optical receiving device 12 of the optical transceiver 40, the beam P being modulated with a constant frequency fc and transmitted from the optical transceiver 50. FIG. 8 shows a flowchart indicating procedures of optical-axis adjustments with the pilot beam P.

The pilot beam P modulated with the constant frequency fc and transmitted from the divergent-light emitter 16 of the optical transceiver 50 is converted, by four PD cells PD_A, PD_B, PD_C and PD_D of the quadrant PD 18, into electric signals SIG_A SIG_B, SIG_C and SIG_D having amplitudes in accordance with the amounts of light, in step S1.

The electric signals SIG_A, SIG_B, SIG_C and SIG_D are amplified by amplifiers 19, 20, 21 and 22, respectively, in step S2. The amplified electric signals SIG_A, SIG_B, SIG_C and SIG_D are switched by a switch 23 under control by a microprocessor 26, such as a microcomputer or DSP (digital signal processor). The switched signals are sequentially rectified by a rectifier 24 so that a frequency component fc is extracted from the pilot beam P, in step S3. The frequency component fc is sent to a level detector 25 so that the level of received light is converted into a DC level, in step S4.

Instead of the microprocessor 26, four rectifiers and four level detectors may be provided to simultaneously process the electric signals SIG_A, SIG_B, SIG_C and SIG_D.

The DC level of light received at each of the four PD cells is sent to the microprocessor 26. The microprocessor 26 calculates the difference between the DC level (SIG_B) from the PD cell PD_B and the DC level (SIG_D) from the PD cell PD_D, in step S5, the two cells being arranged in the horizontal (PAN) direction on the quadrant PD 18.

If the difference of the levels of received light is not zero (NO in step S5), the microprocessor 26 calculates the amount of driving force to rotate the optical transceiver 40 in the direction PAN to have zero in the level difference, in step S6.

The calculated amount of driving force is converted into an analog signal by a D/A converter 27, the analog signal being sent to an actuator 29, in step S7. The actuator 29 rotates the optical transceiver 40 in the direction PAN in accordance with the calculated amount of driving force, in step S8.

If the difference of the levels of received light is zero (YES in step S5), the microprocessor 26 calculates the difference between the DC level (SIG_A) from the PD cell PD_A and the DC level (SIG_C) from the PD cell PD_C, in step S9, the two cells being arranged in the vertical (TILT) direction on the quadrant PD 18.

If the difference of the levels of received light is not zero (NO in step S9), the microprocessor 26 calculates the amount of driving force to rotate the optical transceiver 40 in the direction TILT to have zero in the level difference, in step S10.

The calculated amount of driving force is converted into an analog signal by a D/A converter 28, the analog signal being sent to an actuator 30, in step S11. The actuator 30 rotates the optical transceiver 40 in the direction TILT in accordance with the calculated amount of driving force, in step S12.

Steps S5 to S12 are illustrated in FIG. 7 which shows the pilot beam P spotted at a left-upper section of the quadrant PD 18.

In step [1] (steps S5 to S8): The difference is calculated between the DC level from the PD cell PD_B and the DC level from the PD cell PD_D arranged in the horizontal (PAN) direction on the quadrant PD 18. The optical transceiver 40 is rotated in the direction PAN so that the spot of pilot beam P is shifted to right to have zero in level difference.

In step [2] (steps S9 to S12): The difference is calculated between the DC level from the PD cell PDA and the DC level from the PD cell PD_C arranged in the vertical (TILT) direction on the quadrant PD 18. The optical transceiver 40 is rotated in the direction TILT so that the spot of pilot beam P is shifted down to have zero in level difference.

As disclosed, the optical transceiver 40 is rotated so that the spot of pilot beam P can be positioned at the center of the quadrant PD 18 at which the amounts of light received by the four PD cells are equal. This adjustment provides a match for the optical axes between the optical transceiver 40 and the optical transceiver 50.

The optical receiving device 12 may be a single PD instead of the quadrant PD 18 disclosed above. In optical-axis adjustments with such a single PD, the optical transceiver 40 rotates to catch the pilot beam P, and then stops when it catches the beam P.

Moreover, the optical receiving device 12 may be a two-dimensional imaging device, such as, a CCD (charge-coupled device). In optical-axis adjustments with such a CCD, the optical transceiver 40 can instantaneously catch the pilot beam P and rotate in the direction of the beam P.

In the separated-type video system shown in FIG. 3, the remote control signal R transmitted from the remote controller 17 to the control-signal receiver 2a of the video display apparatus 20 is further transmitted to the video supply apparatus 10.

In detail, the remote control signal R is transmitted from the optical transceiver 50 to the optical transceiver 40 after the optical-axis adjustments therebetween are completed with the pilot beam P modulated with the remote control signal R and emitted by the divergent-light emitter 16 of the optical transceiver 50.

Shown in FIGS. 9A to 9E are formats of the remote control signal R recommended by Association for Electric Home Appliances (AEHA) of Japan.

Figure 9A:
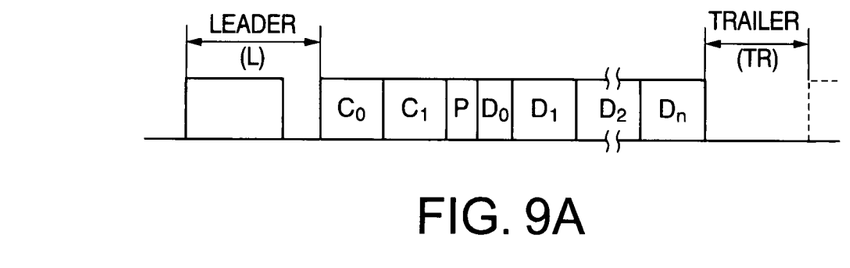
FIGS. 9A to 9E show formats of a remote control signal recommended by Association for Electric Home Appliances of Japan.
Figure 9B:
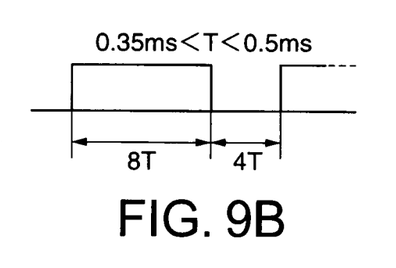
Figure 9C:
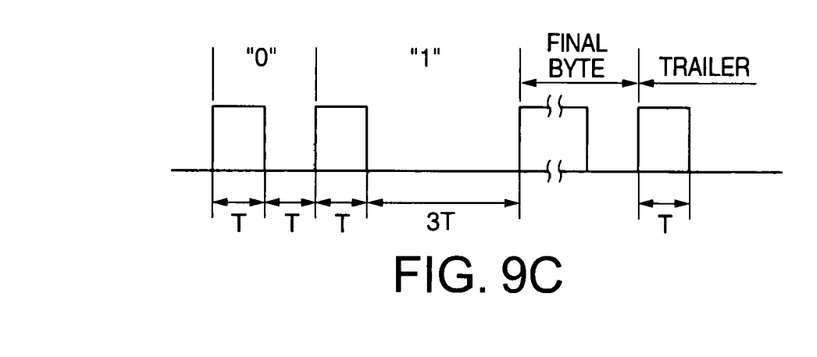
Figure 9D:
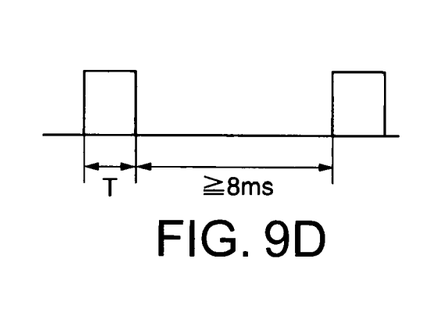
Figure 9E:
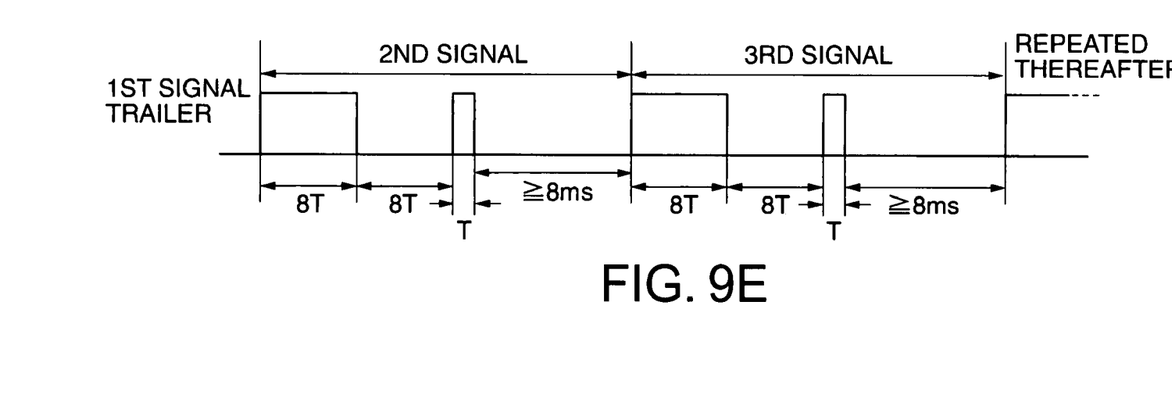

In detail, formats shown in FIGS. 9A to 9E are as follows: the entire format of the remote control signal R in FIG. 9A, a leader field in FIG. 9B; a bit configuration in FIG. 9C; a trailer field in FIG. 9D; and a repeated code in FIG. 9E.

The AEHA-recommended format consists of a leader field, a custom-code field, a parity field of the custom-code field, and a data field. A code registered with AEHA must be used for the custom-code field. In contrast, the number of bytes and definition are free of choice for the data field.

Figure 10:
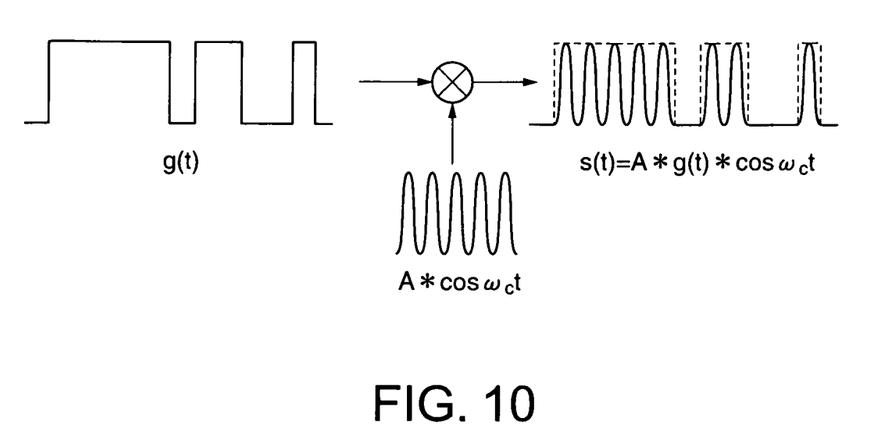
FIG. 10 illustrates an exemplary circuit block diagram for ASK modulation.

Illustrated in FIG. 10 is an exemplary circuit block diagram for modulating the pilot beam P with the remote control signal R by ASK (Amplitude-Shift Keying) modulation, installed in the optical transceiver 50. What is modulated with the remote control signal R, or g(t), is a sign carrier wave $A*\cos \omega_c t$ of the pilot beam P having a single frequency very much higher than the maximum frequency component of the remote control signal R.

The pilot beam P may be modulated by FM or PM modulation instead of ASK modulation. Moreover, it may be modulated not with the remote control signal R itself but with a signal indicating the content of a command carried by the control signal R or other information. Such a signal carrying a command content or other information may be produced by the video display apparatus 20 or the optical transceiver 50.

Figure 11:
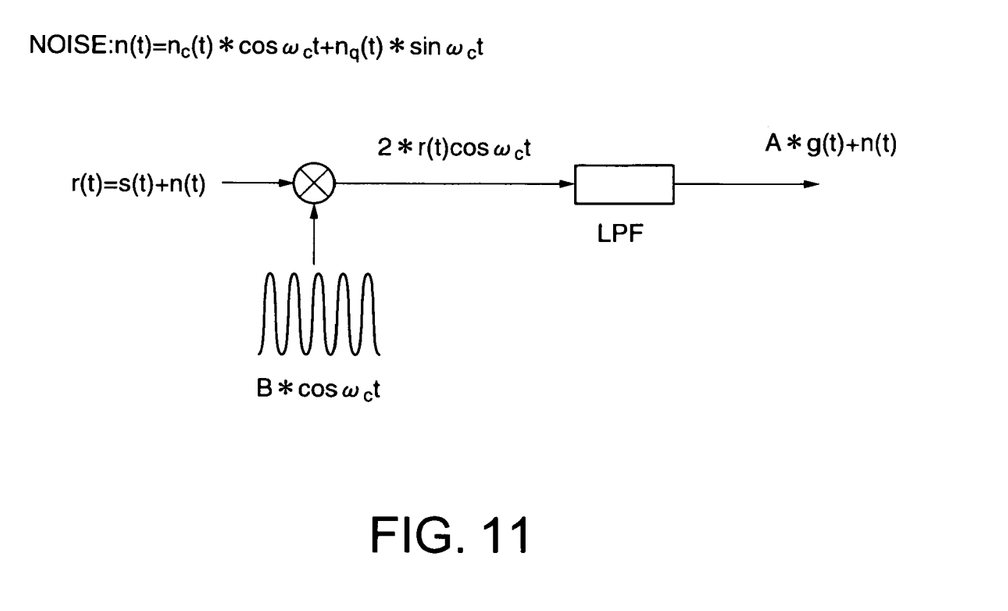
FIG. 11 illustrates an exemplary circuit block diagram for ASK demodulation.

Illustrated in FIG. 11 is an exemplary circuit block diagram for demodulating the remote control signal R from the pilot beam P modulated by ASK modulation, installed in the optical transceiver 40. The control signal R is demodulated by FM or PM demodulation when the pilot beam P is modulated by FM or PM modulation. The modulated and transmitted pilot beam P, or $r(t)=s(t)+n(t)$ is multiplied by a locally oscillated sign wave $B^*\cos \omega_c t$ having the same frequency and phase as the carrier wave lost in the modulation disclosed above, thus the remote control signal $R_1$ or $A^*g(t)+n(t)$ being demodulated by synchronized detection. The pilot beam P may be demodulated by FM or PM demodulation instead of ASK demodulation.

Second Embodiment

A second embodiment of an optical wireless communications system according to the present invention has the following additional features to the first embodiment disclosed above.

The pilot beam P for optical-axis adjustments emitted by the divergent-light emitter 16 of the optical transceiver 50 can be modulated with a signal carrying several types of information.

Such information may be adjustments information for the optical transceiver 50 as to whether it is receiving an enough amount of light carrying video and audio signals, information on conditions of the optical transceiver 50, the video display apparatus 20 as to whether images are being displayed thereon, etc.

Modulation of the pilot beam P with such information allows, for example, information on receiving conditions at the optical transceiver 50 to be transmitted to the optical transceiver 40, thus achieving further precise optical-axis adjustments.

On completion of the optical-axis adjustments, the following two-way communications are achieved: transmission of video and audio signals from the video supply apparatus 10 to the video display apparatus 20; and transmission of conditions of the video display apparatus 20 and/or the optical transceiver 50 to the video supply apparatus 10 and the optical transceiver 40.

These features allow users to deal, at the video supply apparatus's side, with troubles arising at the video display apparatus's side.

Third Embodiment

Figure 12:
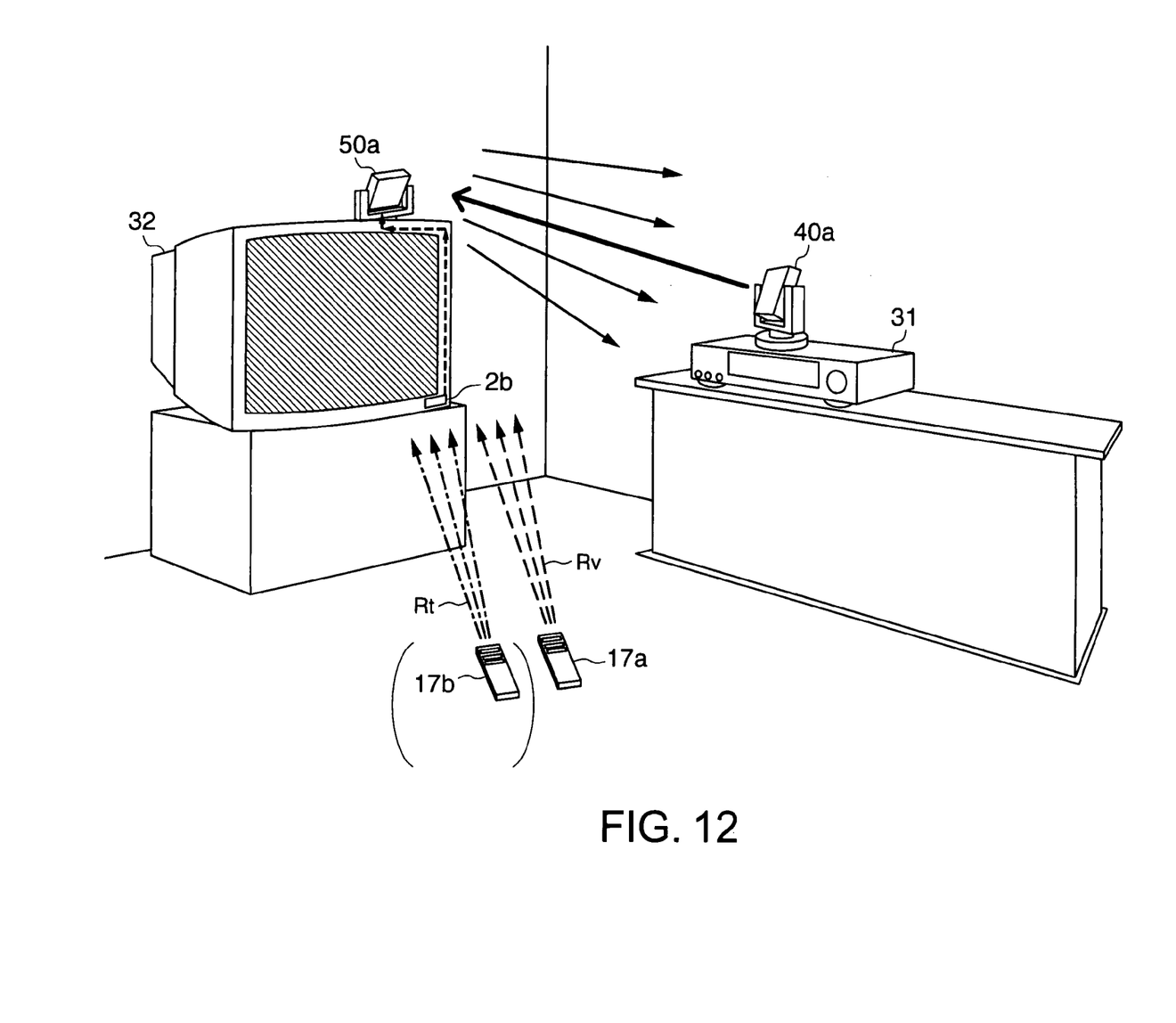
FIG. 12 illustrates a third embodiment of an optical wireless communications system according to the present invention.

Illustrated in FIG. 12 is a third embodiment of an optical wireless communications system according to the present invention applicable to a separated-type video system in which a VTR (video tape recorder) 31 and a TV set 32 are placed apart from each other. An optical signal carrying video and audio signals is transmitted from the VTR 31 to the TV set 32 via the optical wireless communications system.

This system is equipped with an optical transceiver 40*a* connected to the VTR 31 and an optical transceiver 50*a* connected to the TV set 32. The optical transceiver 40*a* emits an optical signal modulated with video and audio signals. The optical transceiver 50*a* receives and demodulates the optical signal to reproduce the video and audio signals. The video and audio signals are sent to the TV set 32.

The third embodiment of the optical wireless communications system allows users to view images reproduced at the VTR 31 on the TV set 32 with no connector cables even though the VTR 31 and the TV set 32 are placed apart from each other.

In known separated-type video systems, a user has to point a remote controller towards a TV set or VTR, depending on what he or she wants to adjust.

On the contrary, in the third embodiment of the optical wireless communications system, like the first embodiment, a user points a remote controller 17*a* only towards the TV set 32. A control-signal receiver 2*b* installed in the TV set 32 receives a remote control signal Rv transmitted from the remote controller 17*a*. The optical transceiver 50*a* modulates a pilot beam P for optical-axis adjustments with the remote control signal Rv received at the control-signal receiver 2*b*, and transmits the modulated pilot beam P to the optical transceiver 40*a*. The optical transceiver 40*a* demodulates the pilot beam P to reproduce the remote control signal Rv. The reproduced remote control signal Rv is sent to the VTR 31.

As a modification to the third embodiment, the control-signal receiver 2*b* can be modified as receiving the remote control signal Rv for controlling the VTR 31 and also a remote control signal Rt for controlling the TV set 32.

A user points the remote controller 17*a* or 17*b* towards the TV set 32 only, depending on either the VTR 31 or TV set 32 the user wants to adjust.

The optical transceiver 50*a* modulates a pilot beam P for optical-axis adjustments with only the remote control signal Rv received at the remote-control signal receiver 2*b*, and transmits the modulated pilot beam P to the optical transceiver 40*a*. The optical transceiver 40*a* demodulates the pilot beam P to reproduce the remote control signal Rv. The reproduced remote control signal Rv is sent to the VTR 31.

The remote control signal Rt received at the remote-control signal receiver 2*b* is used as it is for controlling the TV set 32.

The embodiments disclosed above relate to optical wireless communications systems for transmitting video and audio signals to a video system in which a video supply apparatus and a video display apparatus are placed apart from each other.

Nonetheless, the present invention is also applicable to any optical wireless communications systems for transmitting audio signals only or data signals between two or more of communications apparatuses in which one apparatus can transmit a pilot beam for optical-axis adjustments, to another apparatus, modulated with a control signal for controlling the latter apparatus.

As disclosed above in detail, a pilot beam to be used by a first optical transceiver for adjusting the optical axes between the first optical transceiver and a second optical transceiver is modulated with a remote control signal and transmitted from the second optical transceiver to the first optical transceiver.

Therefore, the present invention achieves transmission of a remote control signal, for example, from a video display apparatus to a video supply apparatus, with simple configuration.

This is very convenient for users in use of separated-type video systems in which a video supply apparatus and a video display apparatus are placed apart from each other.

Moreover, according to the present invention, a pilot beam to be used by a first optical transceiver for adjusting the optical axes between the first optical transceiver and a second optical transceiver can be modulated with information on whether the second optical transceiver and/or a video display apparatus are/is working normally and transmitted from the second optical transceiver to the first optical transceiver.

Therefore, the present invention achieves transmission of information on whether the second optical transceiver and/or the video display apparatus are/is working normally from the second optical transceiver to the first optical transceiver, with simple configuration, which provides precise control in accordance with the system conditions.

Furthermore, the present invention achieves transmission of a control signal from one optical wireless communications apparatus to another optical wireless communications apparatus for controlling the latter.

What is claimed is:

1. An optical wireless communications system comprising:
   a first optical wireless communications apparatus for transmitting a pilot beam to be used for optical-axis matching; and
   a second optical wireless communications apparatus having an optical transmitter for converting a video signal into an optical signal and transmitting the optical signal and an optical receiver with optical receiving areas for receiving the pilot beam the optical receiver being adjusted in directions of pan and tilt so that amounts of light of the pilot beam received at the optical receiving areas are equal to each other to have a match for an optical axis of the first optical wireless communications apparatus and another optical axis of the second optical wireless communications apparatus, wherein
   the first optical wireless communications apparatus includes an optical receiver for receiving the optical signal transmitted by the optical transmitter of the second optical wireless communications apparatus, a control-signal receiver for receiving an external remote control signal for controlling at least either the second optical wireless communications apparatus or an apparatus connected to the second optical wireless communications apparatus and a modulator for modulating the pilot beam with the external remote control signal, the pilot beam being different from the optical signal and used for optical-axis matching between the first and second optical wireless communications apparatuses, the first optical communications apparatus further includes an optical transmitter for transmitting the modulated pilot beam to the optical receiver of the second optical wireless communications apparatus, and
   the second optical wireless communications apparatus includes a demodulator for demodulating the modulated and transmitted pilot beam to reproduce the external remote control signal, whereby
   the first optical wireless communications apparatus and the second optical wireless communications apparatus perform optical communication using the optical signal along the optical axes that are matched based on the pilot signal.

2. An optical wireless communications system to be used for a video system having a video supply apparatus and a video display apparatus placed apart from each other comprising:
   a first optical wireless communications apparatus, provided for the video display apparatus, for transmitting a pilot beam to be used for optical-axis matching; and
   a second optical wireless communications apparatus, provided for the video supply apparatus, having an optical transmitter for converting a video signal into an optical signal and transmitting the optical signal to the video display apparatus via the first optical wireless communications apparatus, and having an optical receiver with optical receiving areas for receiving the pilot beam, the optical receiver being adjusted in directions of pan and tilt so that amounts of light of the pilot beam received at the optical receiving areas are equal to each other to have a match for an optical axis of the first optical wireless communications apparatus and another optical axis of the second optical wireless communications apparatus, wherein
   the first optical wireless communications apparatus includes an optical receiver for receiving the optical signal transmitted by the optical transmitter of the second optical wireless communications apparatus, a control-signal receiver for receiving an external remote control signal for controlling at least either the second optical wireless communications apparatus or an apparatus connected to the second optical wireless communications apparatus and a modulator for modulating the pilot beam with the external remote control signal, the pilot beam being different from the optical signal and used for optical-axis matching between the first and second optical wireless communications apparatuses, the first optical communications apparatus further includes an optical transmitter for transmitting the modulated pilot beam to the optical receiver of the second optical wireless communications apparatus, and
   the second optical wireless communications apparatus includes a demodulator for demodulating the modulated and transmitted pilot beam to reproduce the external remote control signal, whereby
   the first optical wireless communications apparatus and the second optical wireless communications apparatus perform optical communication using the optical signal along the optical axes that are matched based on the pilot signal.

3. An optical wireless communications system comprising:
   a first optical wireless communications apparatus for transmitting a pilot beam to be used for optical-axis matching; and
   a second optical wireless communications apparatus having an optical transmitter for converting a video signal into an optical signal and transmitting the optical signal and an optical receiver with optical receiving areas for receiving the pilot beam, the optical receiver being adjusted in directions of pan and tilt so that amounts of light of the pilot beam received at the optical receiving areas are equal to each other to have a match for an optical axis of the first optical wireless communications apparatus and another optical axis of the second optical wireless communications apparatus, wherein
   the first optical wireless communications apparatus including an optical receiver for receiving the optical signal transmitted by the optical transmitter of the second optical wireless communications apparatus, modulates the pilot beam with a specific signal that carries information on conditions of a least either the first optical wireless communications apparatus or an apparatus connected to the first optical wireless communications apparatus, and the second optical wireless communications apparatus demodulates the modulated and transmitted pilot beam to reproduce the specific signal, whereby the first optical wireless communications apparatus the second optical wireless communications apparatus perform optical communication using the optical signal along the optical axes that are matched based on the pilot signal.

4. An optical wireless communications system to be used for a video system having a video supply apparatus and a video display apparatus placed apart from each other comprising:

a first optical wireless communications apparatus, provided for the video display apparatus, having an optical transmitter for transmitting a pilot beam to be used for optical-axis matching; and a second optical wireless communications apparatus, provided for the video supply apparatus, having an optical transmitter for converting a video signal into an optical signal and transmitting the optical signal to the video display apparatus via the first optical wireless communications apparatus, and having an optical receiver with optical receiving areas for receiving the pilot beam, the optical receiver being adjusted in directions of pan and tilt so that amounts of light of the pilot beam received at the optical receiving areas are equal to each other to have a match for an optical axis of the first optical wireless communications apparatus and another optical axis of the second optical wireless communications apparatus, wherein the first optical wireless communications apparatus including an optical receiver for receiving the optical signal transmitted by the optical transmitter of the second optical wireless communications apparatus, modulates the pilot beam with a specific signal that carries information on conditions of at least either the first optical wireless communications apparatus or an apparatus connected to the first optical wireless communications apparatus, and the second optical wireless communications apparatus demodulates the modulated and transmitted pilot beam to reproduce the specific signal, whereby the first optical wireless communications apparatus and the second optical wireless communications apparatus perform optical communication using the optical signal along the optical axes that are matched based on the pilot signal.

* * * * *